United States Patent Office 3,651,121
Patented Mar. 21, 1972

3,651,121
OXYDEHYDROGENATION PROCESS FOR PREPARATION OF DIENES
Roy B. Duke, Littleton, and David P. McGrew, Golden, Colo., assignors to Marathon Oil Company, Findlay, Ohio
No Drawing. Continuation-in-part of applications Ser. No. 722,170, Apr. 18, 1968, and Ser. No. 851,737, Aug. 20, 1969. This application Aug. 10, 1970, Ser. No. 62,722
Int. Cl. C07c 1/00, 5/18
U.S. Cl. 260—465 K
32 Claims

ABSTRACT OF THE DISCLOSURE

Alcohols, e.g. tert-amyl alcohol are dehydrated and oxydehydrogenated in a two-stage, halogenated-promoted process by preferably first passing alcohol-halogen-oxygen mixture over a substantially inert contact-surface, e.g., Alundum, and then passing the mixture over a metallic oxide catalyst, e.g. copper chromite, to produce dienes, e.g. isoprene. Isoprene and other dienes are useful in the manufacture of elastomers used in the manufacture of tires and other elastomeric products.

CROSS REFERENCES TO RELATED APPLICATIONS

U.S. patent application S.N. 722,170, filed Apr. 18, 1968 now abandoned and U.S. patent application S.N. 851,737 filed Aug. 20, 1969 (a continuation-in-part thereof) now U.S. Pat. 3,522,326 issued July 28, 1970 relates to the general field of the present invention and teaches a two-stage halogen-promoted, oxydehydrogenation process for the preparation of monomers, e.g., styrene from ethylbenzene. U.S. patent application S.N. 828,351 filed May 27, 1969 describes a two-stage, halogen-promoted process for oxidatively coupling and dehydrogenating methyl-substituted aromatic and heterocyclic compounds, e.g., stilbene from toluene. U.S. patent application S.N. 839,045 filed July 3, 1969 describes a two-stage, halogen-promoted oxydehydrogenation process for converting propionitrile and isobutyronitrile to acrylonitrile and methacrylonitrile, respectively.

BACKGROUND OF THE INVENTION (1) Field of the invention

The present invention relates to the chemistry of carbon compounds, more specifically to preparation of acyclic diolefins from oxygen-containing compounds, generally classified in the United State Patent Office within Class 260, subclass 681.

(2) Description of the prior art

The following U.S. patents teach the preparation of isoprene: U.S. 3,299,162 (oxidizing isopentane to the hydroperoxides, reducing to tert-amyl alcohol, dehydrating and dehydrogenating to isoprene); 3,360,584, 3,360,585 (both oxidizing isohexanes to hydroperoxide, reducing to alcohol, and dehydrating and cracking to isoprene); 3,391,213 (oxidizing isopentane to 2-methylbutene-2 oxide, then dehydrating and isomerizing to isoprene); 3,391,214 (oxidizing isopentanes to 2-methylbutene-2 oxide and dehydrating to isoprene); 3,391,215. Other pertinent U.S. patents are U.S. 3,284,533 which manufactures isoprene by catalytically decomposing 4,4-dimethyl-metadioxane in the presence of steam; U.S. 2,967,897 prepares isoprene from 2-methyl-2-butene by oxidizing in the presence of a photosynthesizer to form hydroperoxides which are first reduced and then dehydrated to produce isoprene; and U.S. 2,516,849 which produces butadiene from alcohols by dehydrogenating and dehydrating them in the presence of high-speed electrons. None of these prior art processes utilize a halogen-promoted, copper chromite or other metallic oxide catalyst of the present invention.

SUMMARY (1) General summary of the invention

According to the invention, dienes having the general formula I,

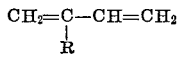
$$CH_2=C-CH=CH_2$$
$$|$$
$$R$$
I where R is hydrogen, alkyl, or aryl are prepared by oxidatively dehydrating and dehydrogenating alcohols of the general Formula II, preferably containing 0–20, more preferably 0–6, most preferably 0–2 carbons. R can be unsubstituted or substituted, e.g., with $NO_2$, Cl, Br, I, F, or CN groups so long as the substituents do not interfere with the reaction or catalyst. This can readily be established by routine trial runs.

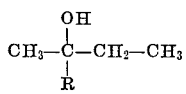
$$OH$$
$$|$$
$$CH_3-C-CH_2-CH_3$$
$$|$$
$$R$$
II

The process is conducted in the vapor phase by forming a reaction mixture of the alcohol with oxygen or an oxygen-containing gas and a halogen or halogen-containing compound and then passing said reaction mixture through a reactor containing first, either free space or a space filled with a substance which is substantially inert to reaction with the halogen, and then over a catalytic mass containing a metallic salt, hydroxide, or oxide of an element selected from Group Ia, IIa, Ib, VIb, VIII and the Lanthanide Series of the Periodic Table of the Elements or mixtures thereof.

As compared to the aforementioned prior art processes, the more direct route of the present invention reduces capital investment required for commercial isoprene production facilities, simplifies operations and reduces operating costs.

(2) Utility of the invention

The dienes of the present invention, especially isoprene, are especially useful in the preparation of polymers, particularly vulcanizable elastomers, e.g., see Encyclopedia of Polymer Science and Technology, volume 7, pp. 782–855, Interscience Publishers, New York (1967).

BRIEF DESCRIPTION OF THE DRAWINGS

Because of the nature of the present process no drawing is provided in the present application.

DESCRIPTION OF THE PREFERRED EMBODIMENTS (1) Starting materials

The alcohols which may be utilized as starting materials for this invention should preferably have from 2 to about 20 carbon atoms (more preferably 2 to 12) and will have the following general structure I,

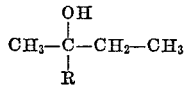
$$OH$$
$$|$$
$$CH_3-C-CH_2-CH_3$$
$$|$$
$$R$$

wherein R may be hydrogen, alkyl (e.g., methyl, ethyl, isopropyl), or aryl (e.g., phenyl, naphthalyl, p-chlorophenyl). Suitable organic compounds include, for example, tert-amyl alcohol, sec-butyl alcohol, and 2-phenyl-2-butanol.

The halogen promoter used in the present invention may be a halogen, e.g. iodine, bromine, chlorine, or an interhalogen compound, e.g. iodine monochloride, bromine monochloride, or hydrohalic acids, e.g., hydrogen chloride, hydrogen bromide, or hydrogen iodide. The molar ratio of halogen-to-alcohol in the reaction mixture will preferably be between about 0.001 to about 1.0, more preferably 0.005 to about 0.10, and most preferably from about 0.01 to about 0.05. Mixtures of halogen-containing compounds may, of course, be employed.

(2) Inert materials

The inert materials which are useful in the practice of this invention include those materials which do not react with the halogen promoter under the conditions of the reaction. Substances such as glass, Carborundum, ceramics, Mullite, Alundum, Vermiculate, granular rocks, and the like fall into the category of inert materials. The reactor, however, need not necessarily be packed with one of said inert materials over which the reaction mixture is passed prior to contact with the catalyst, although this is preferable. Alternatively, the reaction mixture may be passed through tubes, pipes, and the like, made of alloys, ceramic materials, or other materials that do not react with the halogen under the conditions of the reaction, but do present contact surfaces.

(3) Catalysts

Many catalysts have been evaluated in the two-stage oxydehydrogenation process other than those described in the Examples. All of these catalysts have given higher yields and selectivities in the two-stage oxydehydrogenation process as compared to single-stage operation. Of the catalysts evaluated, those consisting of metallic salts, oxides, and hydroxides, and mixtures thereof containing elements of Groups I$a$, II$a$, I$b$, VI$b$, VIII, and the Lanthanide Series of the Periodic Table of the Elements proved superior. Catalyst salts and hydroxides will generally be converted to oxides during the reactions of the invention.

The preferred catalysts for use in the present invention are chromites of the general formula:

$$(M^1)_j(Cr_2O_4)_k$$

where $i$ is the valence state of metal M and $j$, and $k$ are integers such that $$j=i/2k$$

and M is preferably an element from Groups II$a$, IV$a$, V$a$, or I$b$ through VII$b$ and VIII of the Periodic Table. Rare earth element chromites are also excellent catalysts. Mixtures of several chromites are also acceptable catalysts, as well as chromites containing lesser amounts of oxides, hydroxides, or salts of the elements of Group I$a$ of the Periodic Table.

The most preferred catalyst for use in the present invention is a copper chromite composition. The copper chromite catalysts may be modified to incorporate the synergistic effects of lesser amounts of the elements of Groups I$a$, II$a$, VIII and the Lanthanide Series of the Periodic Table of the Elements in the form of salts, hydroxides, or oxides. Such catalysts may be obtained commercially or may be prepared by one skilled in the art. Commercially available catalysts such as Girdler's G-22 and T-531, or Harshaw's Cu-1800 and Cu-1106 are suitable. Alternatively, the copper chromite catalysts may be prepared by thermally decomposing copper chromate, or by other methods employed by those skilled in the art. A review of the various routes to chromites may be found in the following references: Chromium, M. J. Udy, Reinhold Publishing Co., New York, 1956 and Reactions of Organic Compounds over Copper-Chromium Oxide and Nickel Catalysts, Homer Adkins, University of Wisconsin Press, 1937. The chromite catalysts may be tableted for use in fixed bed reactors or may be pulverized and sized for use in fluidized bed reactors. The tableted catalysts may contain binders such as sodium silicate, sodium aluminate, magnesium silicate, and the like, or may be supported on carriers such as Kieselguhr, alumina, silica, magnesia, zirconia, thoria, pumice, and the like. The surface areas of the catalysts range between 0.1 and 300 square meters per gram.

(4) Reactors

The reactors used in the practice of this invention are preferably constructed of, or lined with, or otherwise contain, titanium, tantalum, nickel, or alloys containing one or more of these metals. Particularly preferred are alloys containing at least 40% nickel, 0 to 30% of the metals iron, chromium, and molybdenum, and 0 to 10% of the metals vanadium, cobalt, tantalum, and niobium, and 0–10% of the element silicon. Examples of such useful alloys of nickel include the stainless steels, the Hastelloys,[1] the Inconels[2] and the Incoloys[3]. The reactor shape is not narrowly critical, although tubes are most convenient. In particularly preferred embodiments, the upper-portion of the reactor is packed with the inert substances such as ceramic, Mullite, Carborundum, glass, Vermiculite, Alundum, naturally occurring granular rocks and the like over which the reaction mixture is passed prior to entering the catalyst section of the reactor, thus providing a two-stage reactor. Alternatively, the reactants may be preheated in tubes, pipes, etc. made of the above-mentioned alloys or other materials which are substantially inert, such as clays, Mullite, Alundum, or other ceramic compositions. The ratio of the volume of inert to the volume of catalyst zones can be varied to suit the particular feed and conditions employed. In general, the inert zone volume will be preferably 0.2 to 20, more preferably 0.4 to 5, and most preferably 0.6 to 2 times the volume of the catalyst zone.

(5) Oxidizing agent

Oxygen, the preferred oxidizing agent, can be introduced to the reactor as pure oxygen, or as oxygen diluted with other gases such as helium, nitrogen, carbon monoxide, carbon dioxide, or as air. The molar ratio of oxygen to hydrocarbon should be from 0.01 to 3.0 or greater and most preferably between 0.10 to aobut 1.2. It is also preferable to form a reaction mixture of the oxygen or oxygen-containing gas, the hydrocarbon, and the halogen or halogen-containing compound prior to introducing the reactants into the reactor.

(6) Temperature

The reaction is effected by passing the reaction mixture first through the section of the reactor containing the inert substance or void space at temperatures ranging from 300° to 1300° F., but preferably between 600° and 1200° F., and then through the section of the reactor containing the catalyst at temperatures ranging from 300° to 1300° F., but preferably between 600° and 1200° F. Most preferably, the two sections of the reactor are operated between 750° and 1150° F. It is not necessary to operate both sections at the same temperature and in certain instances, improved yields are obtained when operating the two sections of the reactor at different temperatures.

(7) Pressures

The reaction may be effected at pressures ranging from 0.01 to 100 atmosphres, but preferably, between 0.1 and 5 atmospheres, and most preferably at about 0.8 to about 1.2 atmospheres.

(8) Flow rates

The flow rates of the reactants may be varied widely but, preferably, the flow rates of the hydrocarbons should range from about 0.01 to about 10 liquid volumes per volume of reactor per hour and most preferably, between

---

[1] Trademark of Hanes Stellite Co., Div. of Union Carbide Corp., 270 Park Ave., N.Y. 10017; for a series of nickel-base alloys, having high resistance to corrosives, such as hot hydrochloric acid, hot sulfuric acid, wet chlorine, etc. as well as excellent physical and mechanical properties.
[2] Trademarks of International Nickel Co., 71 Wall St., N.Y. 10005; Inconel—an alloy containing approximately 76% nickel, 16% chromium, and 6% iron.
[3] Incoloy—an alloy containing approximately 32% nickel, 21% chromium and 46% iron.

about 0.10 to 1.0 liquid volumes of organic compound per volume of reactor per hour. Space velocities may also be calculated in terms of gaseous hourly space velocity, abbreviated GHSV, which is defined as the volumes of reactant vapor, calculated under standard conditions (STP), passed per hour per unit volume of the reaction zone. Inert gases, such as nitrogen and helium are considered as part of the reactant vapor. Gaseous hourly $$\text{Yield} = \frac{100 \text{ (moles isoprene)}}{\text{(moles alcohol charged)}}$$

$$\text{Selectivity} = \frac{\text{yield}}{\text{conversion}}$$

Results utilizing tert-amyl alcohol as the starting material are summarized in Table 1.

TABLE 1.—OXIDATIVE DEHYDRATION AND DEHYDROGENATION OF TERT-AMYL ALCOHOL

| Example No. | GHSV, hr.$^{-1}$ | $O_2^d$ alcohol | Conversion, percent | Yield, percent | | Selectivity, olefins | Accountability, percent | Olefin composition, percent | | | | |
|---|---|---|---|---|---|---|---|---|---|---|---|---|
| | | | | Olefins | Isoprene | | | Unknown | 3-methyl-butene-1 | 2-methyl-butene-1 | 2-methyl-butene-2 | Isoprene |
| 1$^a$ | 196 | 0.96 | 90.4 | 73.6 | 36.7 | 0.814 | 83.1 | 1.6 | 2.1 | 23.6 | 23.1 | 49.2 |
| 2$^a$ | 218 | 0.44 | 68.2 | 59.3 | 25.1 | 0.869 | 84.5 | 0.9 | 1.6 | 23.2 | 27.3 | 47.0 |
| 3$^a$ | 238 | 0.52 | 94.1 | 83.0 | 32.2 | 0.882 | 88.9 | 2.2 | 2.2 | 26.8 | 32.2 | 38.1 |
| 4$^b$ | 268 | 0.28 | 94.5 | 89.3 | 19.9 | 0.944 | 94.7 | 0.3 | 2.2 | 34.9 | 40.8 | 21.8 |
| 5$^a$ | 215 | 0.79 | 92.3 | 59.2 | 25.4 | 0.641 | 70.4 | 0.6 | 2.3 | 24.5 | 30.4 | 42.2 |
| 6$^c$ | 239 | 0.51 | 94.3 | 80.2 | 32.6 | 0.850 | 87.6 | 0.1 | 1.2 | 27.1 | 31.6 | 40.0 |
| 7$^c$ | 285 | 0.26 | 89.6 | 80.4 | 17.6 | 0.897 | 96.6 | 0.2 | 2.1 | 35.1 | 41.1 | 21.4 |
| 8$^c$ | 214 | 0.80 | 93.6 | 79.9 | 38.2 | 0.853 | 89.6 | 0.1 | 1.4 | 22.8 | 28.5 | 47.2 |

$^a$ Stainless steel reactor, copper chromite catalyst (36016).
$^b$ Nickel reactor, copper chromite catalyst (36023).
$^c$ Hasteloy C reactor, copper chromite catalyst (36023).
$^d$ Oxidizing agent is air.
NOTE.—Conditions, Temperature, 1,000° F.; iodine, 2.0 percent; reactors, 26 inch x 1 inch tubes, upper section packed with ceramic beads, lower section with catalyst.

space velocities between about 5 and 1500 hrs.$^{-1}$ may be employed for the oxidative dehydrogenation reaction but, preferably, between 10 and 1000 hrs.$^{-1}$, and most preferably between 100 to 600 hrs.$^{-1}$ are used.

(9) Batch or continuous operation

While the present invention will preferably be conducted on a continuous basis with continuous feed of starting materials and removal of products, it may, in some instances, be preferable to produce specialized products in a batch-type reactor, e.g. an autoclave. However, the flow from an inert contact section to a catalytic reactor section will be adavntageous even in batch-type operations.

EXAMPLES

Each of the following examples is carried out in a tubular reactor, 1" in diameter and 26" long, constructed of Hastelloy C alloy. The reactor has an internal thermowell, 0.25" in diameter extending the length of the reactor. The reactor is heated in a furnace and the temperature controlled and recorded from thermocouples located inside the thermowell. The lower-half of the reactor volume was filled with a tableted copper-chromite catalyst and the upper-half with ⅛" Mullite spheres.

The starting materials, e.g., tert-amyl alcohol, in which the halogen is dissolved, is fed to a mixing T by means of a calibrated metering pump and is mixed in the T with air apportioned through a calibrated rotometer. The reaction mixture is then passed downward through the reactor. The flow rates were calculated in terms of gaseous hourly space velocity (GHSV). All the liquids charged to the reactor are assumed to be ideal gases at standard temperature and pressure. The oxygen-to-alcohol ratios are molar ratios.

The reactor effluent is passed through a Graham-type, chilled-water condenser and then into a jacketed separatory funnel where the temperature is controlled at about 50° C. The isoprene and isoamylenes formed in the reaction are vaporized from the condensate and collected in a Dry-Ice trap. The products are separated and analyzed by chromatographic techniques. Conversion yields and selectivities are calculated on the amount of condensable product in the following manner:

$$\text{Conversion} = \frac{100 \text{ (moles alcohol reacted)}}{\text{(moles alcohol charged)}}$$

MODIFICATIONS OF THE INVENTION

It should be understood that the invention is capable of a wide variety of modifications and variations which will be apparent to those skilled in the art upon a reading of the present specification.

For example, various other alcohols including butan-2-ol, 2-phenylbutan-2-ol, and 2-(p-chlorophenyl) butan-2-ol may be utilized in place of the tert-amyl alcohol exemplified above. Different promoters including bromine can be utilized in place of the iodine. Any of the wide variety of metallic oxides, salts, or hydroxides described under the heading "Catalysts" above may be substituted for the copper chromite exemplified. The inert materials may be dispensed with and the reactor completely filled with the catalyst, although yields will be significantly reduced in so doing. Various different inert materials may be substituted in the first portion of the reactor, e.g., Alundum, glass, Mullite, etc. Various portions of the reactor may be operated at different temperatures and the optimum temperature for each portion of the two stage reactor design can be readily determined by routine trial runs. Oxygen, or oxygen-containing gases other than air, can be substituted for the air utilized in the above examples. The first portion of the reactor can be allowed to remain empty with the walls of the reactor itself serving as contact surface and, to some extent, enhancing the yields. Inter-halogen compounds can be substituted as promoters, e.g., IBr, $ICl_3$, ClF, etc. in specialized instances. The catalysts may be mixed with any of a wide variety of inert carrier materials. As a further illustration of a useful modification of the invention, propylene oxide and isoprene are produced from isopentane by the following three-step process:

(1) Isopentane is oxidized with molecular oxygen to isopentane hydroperoxide at temperatures ranging from 100 to 200° F., but preferably between 100 to 160° C., and at oxygen pressures ranging from 100 to 800 p.s.i.g.

(2) Isopentane hydroperoxide is reacted with propylene to produce propylene oxide and tert-amyl alcohol in the presence of a catalyst comprising oxides or salts of titanium, molybdenum, chromium, vanadium, tungsten, rhenium, selenium, and tantalum.

(3) Tert-amyl alcohol is then oxidatively dehydrated and dehydrogenated by the disclosed process to give a mixture of isoprene and isoamylenes.

Similarly, 2-phenylbutane can be oxidized to 2-phenylbutane hydroperoxide, said hydroperoxide then being reacted catalytically with propylene to give propylene oxide and 2-phenylbutan-2-ol which is subsequently oxidatively dehydrated and dehydrogenated to 2-phenylbutadiene.

As another useful modification of the invention, isoprene and caprolactam are produced by the following four-step process:

(1) Isopentane is oxidized to tert-amyl hydroperoxide.

(2) The peroxide is reacted catalytically with cyclohexylamine thereby converting the amine to cyclohexanone oxime and the tert-amyl hydroperoxide to tert-amyl alcohol.

(3) Cyclohexanone oxime is then rearranged in the presence of an acid catalyst to give caprolactam.

(4) Tert-amyl alcohol is oxidatively dehydrated and dehydrogenated according to the process of this invention to give isoprene.

As another useful modification of this invention, isopentane is converted to isoprene by the following four-step process:

(1) Isopentane is oxidized to isopentane hydroperoxide.

(2) Isopentane hydroperoxide is reacted catalytically with the mixed isoamylenes obtained from oxidatively dehydrating and dehydrogenating tert-amyl alcohol to give largely 2-methylbutene-2 oxide, along with minor amounts of 1-oxide and 3-oxide, and tert-amyl alcohol.

(3) The tert-amyl alcohol is then oxidatively dehydrated and dehydrogenated to isoprene and mixed isoamylenes.

(4) The 2-methylbutene oxide is catalytically dehydrated to isoprene.

As another particular modification of the invention, methacrylic acid and isoprene are produced from isopentane and isobutylene by the following four-step process:

(1) Isobutylene is catalytically oxidized to methacrolein.

(2) Isopentane is oxidized to isopentane hydroperoxide.

(3) Isopentane hydroperoxide is reacted catalytically with methacrolein to give methacrylic acid and tert-amyl alcohol.

(4) Tert-amyl alcohol is oxidatively dehydrated and dehydrogenated according to the present process to give isoprene.

Other useful modifications of the invention to produce epoxides, oximes or unsaturated acids from tert-amyl hydroperoxide all fall within the scope of the present invention and above-mentioned specific processes only serve to illustrate the general utility of the invention.

What is claimed is:

1. An oxydehydrogenation process for preparing dienes having the structure:

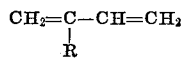

where R is hydrogen, alkyl, or aryl, and can be either unsubstituted or substituted with groups which do not interfere with the reaction or catalyst and wherein R contains from 0 to about 20 carbon atoms, said process being conducted in the vapor phase by contacting an alcohol having the structure:

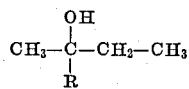

where R is as described above, with oxygen or an oxygen-containing gas and a halogen-containing promoter to form a reaction mixture, thereafter passing said reaction mixture through reactor means containing a catalyst comprising metallic salts, hydroxides, or oxides, or mixtures of elements from Groups Ia, IIa, Ib, VIb, VIII, or the Lanthanide Series of the Periodic Table of the Elements at a gaseous hourly space velocity of from about 5 to about 1500 hr.$^{-1}$ and at temperatures of from about 300 to about 1300° F.

2. The process of claim 1 wherein the catalyst comprises copper chromite.

3. The process of claim 1 wherein the catalyst comprises copper chromite and salts, hydroxides, or oxides of the elements of Groups Ia, IIa, VIII, or the Lanthanide Series of the Periodic Table of the Elements.

4. The process of claim 3 wherein the catalyst is comprised of copper chromite and a salt, oxide, or hydroxide of barium.

5. The process of claim 3 wherein the catalyst is comprised of copper chromite and oxides, hydroxides or salts of iron.

6. The process of claim 3 wherein the catalyst is comprised of copper chromite and oxides, hydroxides or salts of nickel.

7. The process of claim 3 wherein the catalyst is comprised of copper chromite and oxides, hydroxides, or salts of potassium.

8. The process of claim 3 wherein the catalyst is comprised of copper chromite and oxides, hydroxides, or salts of cerium.

9. The process of claim 1 wherein at least one of the zones contains an elemental metal comprising titanium, tantalum, nickel, or alloys containing these elements.

10. The process of claim 9 wherein the alloy contains at least 40% nickel, 0 to 30% of the metals iron, chromium, and molybdenum, and 0 to 10% of the metals vanadium, cobalt, tantalum, and niobium, and 0-10% of the element silicon.

11. The process of claim 1 wherein said hydrocarbons have 2 to about 20 carbon atoms.

12. The process of claim 1 wherein said reaction means comprise two zones, the first consisting of either substantially free space or containing a substance substantially inert to its reaction with the halogen or halogen-containing compound, and the second zone containing said catalyst.

13. The process of claim 1 wherein oxygen is in a molar ratio of about 0.1 mole to about 3 moles of elemental or combined oxygen per mole of hydrocarbon present in the reaction mixture.

14. The process of claim 1 wherein the halogen is in a molar ratio of from about 0.001 to about 0.1 mole of elemental or combined halogen per mole of hydrocarbon present in the reaction mixture.

15. The process of claim 12 wherein the reaction mixture is passed over said inert material at a temperature of from about 600° to about 1200° F.

16. The process of claim 6 wherein the reaction mixture is passed over the catalyst at a temperature of about 600 to about 1200° F.

17. The process of claim 1 wherein the oxydehydrogenation is carried out at a pressure in the range of from about 0.1 to about 10 atmospheres.

18. The process of claim 1 wherein the halogen-containing compound comprises chlorine, bromine, or iodine.

19. The process of claim 1 wherein the halogen-containing compound comprises hydrochloric, hydrobromic or hydroiodic acid.

20. The process of claim 1 wherein the halogen-containing compound comprises an interhalogen compound.

21. The process of claim 12 wherein the inert material of the inert stage comprises clay or ceramic compositions.

22. The process of claim 12 wherein the inert material of the inert stage is expanded hydrous silicate.

23. The process of claim 12 wherein the inert material of the inert stage is silicon carbide.

24. The process of claim 12 wherein the inert material of the inert stage is granular rock materials.

25. The process of claim 12 wherein the inert material of the inert stage is fused alumina.

26. The process of claim 12 wherein the inert material of the inert stage is alumina silicate.

27. The process of claim 1 wherein the alcohol is tert-amyl alcohol and the product is isoprene.

28. The process of claim 1 wherein the alcohol is sec-butyl alcohol and the product is butadiene.

29. The process of claim 1 wherein the alcohol is 2-phenylbutan-2-ol and the product is 2-phenylbutadiene.

30. The process of claim 1 wherein the alcohol is 2-(p-chlorophenyl)butan-2-ol and the product is 2-(p-chlorophenyl) butadiene.

31. The process of claim 1 wherein the alcohol is 2-(p-tert-butylphenyl) butan-2-ol and the product is 2-(p-tert-butylphenyl) butadiene.

32. The process of claim 1 wherein the alcohol is 2-(p-cyanophenyl)butan-2-ol and the product is 2-(p-cyanophenyl) butadiene.

References Cited

UNITED STATES PATENTS 2,853,535    9/1958    Friedman    260—681
3,347,902    10/1967    Grasselli et al.    260—465.9

DELBERT E. GANTZ, Primary Examiner

V. O'KEEFE, Assistant Examiner

U.S. Cl. X.R.

260—465.7, 465.9, 650 R, 668, 681

UNITED STATES PATENT OFFICE
CERTIFICATE OF CORRECTION

PO-1050
(5/69)

Patent No. 3,651,121      Dated March 21, 1972

Inventor(s) Roy B. Duke and David P. McGrew

It is certified that error appears in the above-identified patent and that said Letters Patent are hereby corrected as shown below:

Col. 3, line 42:     "j=i/2k" should read $-- j = i^{\frac{2k}{}} --$

Signed and sealed this 11th day of July 1972.

(SEAL)
Attest:

EDWARD M. FLETCHER, JR.
Attesting Officer

ROBERT GOTTSCHALK
Commissioner of Patents